United States Patent Office 3,472,898
Patented Oct. 14, 1969

3,472,898
PREPARATION OF AMINO-SUBSTITUTED
SULFOXIDES AND SULFONES
Rector P. Louthan, Bartlesville, Okla., assignor to
Phillips Petroleum Company, a corporation of
Delaware
No Drawing. Filed Oct. 22, 1965, Ser. No. 502,479
Int. Cl. C07c 147/12, 147/00, 87/14
U.S. Cl. 260—583    10 Claims

ABSTRACT OF THE DISCLOSURE

Process for the preparation of amino-substituted sulfoxides and amino-substituted sulfones. In a more specific aspect, this relates to the preparation of amino-substituted sulfoxides and sulfones by the reaction of halo-substituted sulfoxides and sulfones with secondary amines.

Previously, amino-substituted sulfoxides and sulfones have been prepared by the oxidation of amino sulfides. A variety of oxidants, such as nitric acid, chromic acid, organic peroxides, and hydrogen peroxide, were used. For example, to prepare an amino-substituted sulfone, the corresponding sulfide was contacted with 30 perecnt hydrogen peroxide in glacial acetic acid. However, all of these reactions resulted in the formation of appreciable quantities of N-oxides which contaminated the desired product. The present process avoids this contamination by oxidizing halo-substituted sulfide compounds which are then reacted with a secondary amine to form the desired amino-substituted sulfoxide or sulfone.

It is an object of this invention to provide an improved method for the preparation of amino-substituted sulfoxides and sulfones. Another object of the invention is to provide a process for the preparation of amino-substituted sulfoxides and sulfones which avoid the production of N-oxides. Other objects, aspects and advantages of this invention will be evident to those skilled in the art upon a study of the specification and the appended claims to the invention.

In accordance with the process of this invention, amino-substituted sulfoxides and sulfones of the formula

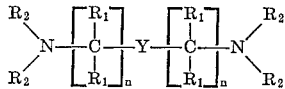

wherein each $R_1$ is seletced from the group consisting of hydrogen, methyl radical and ethyl radical; each $R_2$ is selected from the group consisting of alkyl, aryl, alkaryl, aralkyl, cycloalkyl, alkylcycloalkyl and cycloalkylalkyl radicals containing from 1 to 10 carbon atoms, inclusive and wherein each $R_1$ in the molecule can be alike or different and each $R_2$ in the molecule can be alike or different; and wherein the two $R_2$ groups on the same nitrogen atom can, together with the nitrogen atom, form a heterocyclic ring; each $n$ is a whole integer of from 1 to 5, inclusive; and Y is selected from the group consisting of

and

are prepared by reaction of an amine of the formula

wherein each $R_2$ is as previously defined, with a halo-substituted sulfone or sulfoxide of the formula

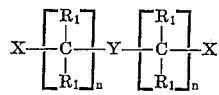

wherein each $R_1$, Y and $n$ are as previously defined, and X is selected from the group consisting of chlorine and bromine.

Some examples of amines of the formula

which can be employed as one reactant in the process of this invention are:

dimethylamine
methylethylamine
di-n-propylamine
di-n-butylamine
di-tert-butylamine
di-n-decylamine
diphenylamine
di-benzylamine
di(4-n-butylphenyl)amine
di(4-phenylbutyl)amine
di(1-naphthyl)amine
dicyclopropylamine
dicyclobutylamine
dicyclohexylamine
dicyclooocytylamine
dicyclodecylamine
phenyl(2-naphthyl)amine
n-butylphenylamine
ethylcyclopentylamine
propyl(4-methylphenyl)amine
methyl(2-phenylethyl)amine
phenylcylopentylamine
benzylcyclopentylamine
cyclohexyl(2-naphthyl)amine
piperidine
aziridine
azetidine
pyrrolidine
2-methyl-4-ethylpiperidine
3,4-diethylpyrrolidine
2-methyl-4-ethylpiperidine
2,3-dimethylazetidine and the like.

Some examples of halo-substituted sulfones or sulfoxides which can be employed as the other reactant in the formation of the amino-substituted sulfoxides and sulfones are:

bis(chloromethyl) sulfoxide
bis(bromoethyl) sulfone
bis(2-chloroethyl) sulfone
bis(2-bromopropyl) sulfoxide
2-chloroethyl 3-bromopropyl sulfone
bis(5-chloropentyl sulfoxide
bis (1,2-diethyl-3-methyl-4-chlorobutyl) sulfoxide
bis(3-chloropropyl) sulfone
bis(1,2,3,4,5-pentamethyl-5-bromopentyl) sulfone
bis(3,3-dimethyl-5-chloropentyl) sulfoxide
chloromethyl 2-methyl-3-bromo-n-propyl sulfone
2-bromoethyl 2,2-dimethyl-2-chloroethyl sulfoxide
bis(1-chloro-n-propyl) sulfone
bis(4-chloro-2-ethyl-n-butyl) sulfoxide
bis(1-chloroethyl) sulfone
bis(3-chloro-n-propyl) sulfoxide and the like.

Some examples of compounds which can be prepared by the process of this invention are bis(3-[dimethylamino]-n-propyl) sulfoxide
bis(3-[dimethylamino]-n-propyl) sulfone
bis(4-[diphenylamino]-n-butyl) sulfone
3-[diethylamino]-n-propyl 4-[di-n-butylamino]-n-butyl sulfoxide
bis(5-[diphenylamino]-n-pentyl) sulfoxide
bis(5-[dicyclohexylamino]-n-heptyl) sulfoxide
bis(1-[di-n-octylamino]ethyl) sulfone
bis[3-(1-piperidyl)propyl] sulfone
bis[3,3-dimethyl-5-(1-aziridyl)pentyl] sulfoxide
bis[1,1-diethyl-2-(1-azetidyl)ethyl] sulfone
bis[(1-pyrrolidyl)methyl] sulfoxide
bis[2-(2-piperidyl)isopropyl] sulfone
bis(1,2,3,4,5-pentamethyl-5-[methylethylamino]pentyl) sulfoxide
2-[dicyclohexylamino]-n-butyl 3-[diisobutylamino]-n-butyl sulfone
5-[dibenzylamino]-n-pentyl 4-[n-butyl-pentylamino]-n-butyl sulfoxide
bis[1,1-dimethyl-2-di(2-naphthyl)aminoethyl] sulfone
bis(2-dicyclodecylaminoethyl) sulfoxide
bis[di(4-n-butylphenyl)aminomethyl] sulfone
and the like.

The amino-substituted sulfoxides and sulfones are prepared by reacting one of the above defined halo-substituted sulfoxides and sulfones with one of the amines of the formula

The reaction of the halo-substituted sulfoxide or sulfone with the chosen amine will generally be carried out at a temperature of from 50 to 250° F. for a reaction time generally ranging from one minute to as long as three or more days. This reaction is conveniently carried out in an inert diluent such as methanol, ethanol, or an ether such as tetrahydrofuran, or the amine itself can be utilized as the diluent. The mol ratio of the amine reactant to the halo-substituted sulfoxide or sulfone should be at least the theoretical ratio and it is preferred to utilize excess amine which can range as high as 30 or 40 times the theoretical ratio of amine to halo-substituted sulfone or sulfoxide reactant. If no acid acceptor is present, the theoretical ratio is 4 moles of the amine reactant per mole of the halo-substiuted reactant. If an acid acceptor is present, such as an inorganic base, for example NaOH, KOH, $Na_2CO_3$, MgO, etc., the theoretical ratio is 2:1. At the end of the reaction time the amino-substituted sulfoxide or sulfone product can be recovered from a reaction mixture by a variety of conventional separation methods. One particularly convenient method which can be employed is fractional crystallization. Other recovery methods such as distillation, solvent extraction and the like can also be employed.

The halo-substituted sulfoxide or sulfone reactant which is employed can be prepared from the corresponding halo-substituted sulfide by oxidation with hydrogen peroxide or other oxidant. If one intends to prepare a halo-substituted sulfoxide, it is most convenient to use a low molecular weight alcohol such as methanol as the reaction diluent. On the other hand, if the sulfide is to be converted to the sulfone, it is frequently preferred to use acetic acid or other organic acid as the diluent as the peracid formed in situ further promotes the oxidation. When preparing the sulfoxide, the mol ratio of peroxide to sulfide should be about 1:1, while, if the sulfone is to be prepared, the mol ratio of peroxide to sulfide should be at least 2:1. The preparation of the halo-substituted sulfoxide or sulfone by oxidation of the sulfide can be carried out at temperatures ranging from 50° F. up to the reflux temperature of the reaction mixture.

The amino-substituted sulfoxides and sulfones which are prepared according to the process of this invention are useful as selective solvents for carbon dioxide and hydrogen sulfide. These amino-substituted sulfides and sulfones are also useful as selective solvents for the extraction of aromatics from paraffins.

The following specific examples are intended to illustrate the process of this invention, but are not intended to unduly limit the invention to the particular conditions shown.

EXAMPLE I

A run was carried out in which bis(3-chloro-n-propyl) sulfide was oxidized to the sulfone and subsequently reacted wth dimethylamine to form bis(3-[dimethylamino]-n-propyl) sulfone.

In converting the sulfide to the sulfone, 225 grams of bis(3-chloro-n-propyl) sulfide, 840 cc. of acetic acid (glacial) and 274 grams of 30 percent aqueous hydrogen peroxide were employed. The sulfide and acetic acid were charged to a 2-liter, 3-necked flask equipped with a stirrer, dropping funnel and condenser. The hydrogen peroxide was added dropwise over a one hour period.

After addition of the hydrogen peroxide had been completed, the reaction mixture was allowed to stand overnight. The acetic acid was then stripped off by distillation, after which 500 cc. of isopropyl alcohol was added to the reaction mixture. The crystals which formed were filtered off and dried in a vacuum oven, after which they were recrystallized from isopropyl alcohol. A total of 150.8 grams of white crystals were obtained which had a melting point of 56-59° C.

The bis(3-chloro-n-propyl) sulfone prepared above was then converted to bis(3-[dimethylamino]-n-propyl) sulfone in the following manner. 150.8 grams of the sulfone and 965.3 grams of dimethylamine were charged to a one gallon, stainless steel autoclave which was provided with a stirrer. The reactor was heated with steam, and the temperature ranged from a low of 72° F. to a high of 222° F. over a four hour and 17 minute reaction period.

At the end of the reaction, the reaction mixture was allowed to cool and 500 cc. of isopropyl alcohol was added to the mixture. The resulting mixture was allowed to settle in a flask, after which 70 grams of solid sodium hydroxide was added to the reaction mixture and heated on a steam bath for one hour. The white solid material which formed was filtered out, and the remaining liquid was subjected to vacuum stripping to remove the isopropyl alcohol. The remaining material was then extracted with n-heptane, after which the extract was separated and placed in a refrigerator. White flakes crystallized out, and these crystals were filtered out and washed with n-heptane. After drying in the vacuum over, the yield of dry crystals was 111.8 grams of material melting at 33-35° C. The white flakes were melted and distilled through a short path distillation column and the liquid which came over from 142-144° C. at 0.5 mm. mercury absolute pressure was collected. This material weighed 102.1 grams. When this material was cooled to room temperature, white crystals settled out which melted at 33-35° C. An elemental analysis of the material gave the following:

ELEMENTAL ANALYSIS

| Element | Calculated for $C_{10}H_{24}N_2O_2S$, wt. percent | Found, wt. percent |
| --- | --- | --- |
| Carbon | 50.75 | 50.7 |
| Hydrogen | 10.24 | 10.3 |
| Nitrogen | 11.93 | 11.7 |

It is obvious from the results of the elemental analysis that the compound prepared was bis(3-[dimethylamino]-n-propyl) sulfone.

EXAMPLE II

A run was carried out in which bis(3-[dimethylamino]-n-propyl) sulfoxide was prepared according to the process of this invention.

In this run, 226 grams of bis(3-chloro-n-propyl) sulfide and 363 cc. of methanol were charged to a 2-liter, 3-necked flask equipped with a stirrer, dropping funnel and condenser. The resulting solution was heated to reflux for several minutes, after which 137 g. of 30 percent aqueous hydrogen peroxide was added dropwise. The addition of the hydrogen peroxide required 21 minutes, and the temperature of the reaction mixture rose considerably during the addition of the hydrogen peroxide. The reaction mixture was then allowed to stand for one hour, after which it was transferred to a one gallon stainless steel autoclave provided with a stirrer. Approximately 700 cc. of dimethylamine was fed into the autoclave along with the reaction mixture from the oxidation of the sulfide. The reaction of the dimethylamine with the bis(3-chloro-n-propyl)sulfoxide was carried out at 100–208° F. for 3 hours and 13 minutes. At the end of this reaction time, the heat was turned off and the reaction mixture was allowed to cool to room temperature and stand for 48 hours. The reaction mixture was transferred to a 2-liter, 3-necked flask and the excess dimethylamine was stripped off under reduced pressure. The remaining yellow liquid was then distilled to yield a material boiling at 130° C. at 0.3 mm. mercury absolute pressure. 147.6 grams of this material was obtained which had a refractive index of $n_D^{20}$ 1.4870. An elemental analysis of this material gave the following results:

ELEMENTAL ANALYSIS

| Element | Calculated for $C_{10}H_{24}N_2OS$, wt. percent | Found, wt. percent |
|---|---|---|
| Carbon | 54.4 | 54.7 |
| Hydrogen | 10.98 | 11.1 |
| Nitrogen | 12.80 | 11.8 |

It is obvious from the results of the elemental analysis that the compound prepared was bis(3-[dimethylamino]-n-propyl) sulfoxide.

What is claimed is:

1. A method of preparing amino-substituted compounds of the general formula

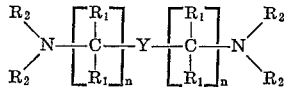

wherein each $R_1$ is selected from the group consisting of hydrogen, methyl and ethyl; each $R_2$ is selected from the group consisting of alkyl, aryl, alkaryl, aralkyl, cycloalkyl, alkylcycloalkyl and cycloalkylalkyl radicals containing up to 10 carbon atoms, inclusive; each $n$ is a whole integer of from 1 to 5, inclusive; and Y is selected from the group consisting of

and

comprising subjecting to oxidizing conditions a first halo-substituted compound of the formula

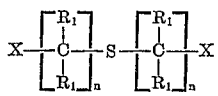

wherein each $R_1$ and $n$ is as defined above, and each X is selected from the group consisting of chlorine and bromine, to produce a second halo-substituted compound of the formula

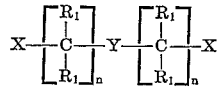

reacting with said second halo-substituted compound an amine of the formula

wherein each $R_2$ is as defined above.

2. A method in accordance with claim 1 wherein the reaction of said second halo-substituted compound with said amine is conducted at a temperature in the range of 50 to 250° F. for a time in the range of one minute to three days.

3. A method in accordance with claim 1 wherein the mol ratio of said amine to said second halo-substituted compound is at least the theoretical ratio.

4. A method in accordance with claim 1 wherein the mol ratio of said amine to said second halo-substituted compound is in the range of 1 to 40 times the theoretical ratio.

5. A method in accordance with claim 1 wherein the reaction of said second halo-substituted compound with said amine is conducted in the presence of an inert diluent.

6. A method in accordance with claim 5 wherein said diluent is selected from the group consisting of methanol, ethanol, said amine and tetrahydrofuran.

7. A method in accordance with claim 1 further comprising recovering said amino-substituted compound.

8. A method in accordance with claim 1 wherein the reaction of said second halo-substituted compound with said amine is conducted in the presence of a diluent at a temperature in the range of 50 to 250° F. for a time in the range of one minute to three days with the mol ratio of said amine to said second halo-substituted compound being at least the theoretical ratio.

9. A method in accordance with claim 1 wherein said second halo-substituted compound is bis(3-chloro-n-propyl) sulfone and said amine is dimethylamine.

10. A method in accordance with claim 1 wherein said second halo-substituted compound is bis(3-chloro-n-propyl) sulfoxide and said amine is dimethylamine.

References Cited

UNITED STATES PATENTS 2,172,822 9/1939 Tamele et al.
2,769,841 11/1956 Oylewski et al.
2,769,839 11/1956 Fincke.

OTHER REFERENCES

Spialter et al., The Acylic Aliphatic Tertiary Amines, MacMillan Company (New York) p. 23.

JOSEPH P. BRUST, Primary Examiner

R. L. RAYMOND, Assistant Examiner

U.S. Cl. X.R.

260—239, 293.4, 326.82, 563, 570.5, 607, 609, 705

UNITED STATES PATENT OFFICE
CERTIFICATE OF CORRECTION

Patent No. 3,472,898           Dated October 14, 1969

Inventor(s) Rector P. Louthan

It is certified that error appears in the above-identified patent and that said Letters Patent are hereby corrected as shown below:

Column 6, after the formula beginning at line 3, insert -- wherein each $R_1$, n, X and Y are as defined above; and --.

SIGNED AND
SEALED
APR 28 1970

(SEAL)
Attest:

Edward M. Fletcher, Jr.
Attesting Officer

WILLIAM E. SCHUYLER, JR.
Commissioner of Patents